United States Patent
Sudoh

(10) Patent No.: US 7,623,298 B2
(45) Date of Patent: Nov. 24, 2009

(54) ZOOM LENS, CAMERA APPARATUS, AND PORTABLE INFORMATION TERMINAL APPARATUS

(75) Inventor: Yoshifumi Sudoh, Machida (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/206,036

(22) Filed: Sep. 8, 2008

(65) Prior Publication Data

US 2009/0067060 A1    Mar. 12, 2009

(30) Foreign Application Priority Data

Sep. 11, 2007    (JP) .............................. 2007-235775

(51) Int. Cl.
*G02B 15/14*    (2006.01)
*G02B 17/00*    (2006.01)
(52) U.S. Cl. ...................................... 359/683; 359/726
(58) Field of Classification Search ................. 359/683, 359/746, 753, 770
See application file for complete search history.

(56) References Cited

U.S. PATENT DOCUMENTS

| 7,227,706 | B2 | 6/2007 | Yagyu et al. | |
| 7,369,322 | B2 * | 5/2008 | Souma | ........................ 359/680 |
| 7,372,636 | B2 | 5/2008 | Sudoh | |
| 2007/0247726 | A1 | 10/2007 | Sudoh | |

FOREIGN PATENT DOCUMENTS

| JP | 2004-102219 | 4/2004 |
| JP | 2004-271937 | 9/2004 |
| JP | 2005-338143 | 12/2005 |
| JP | 2005-338344 | 12/2005 |
| JP | 2007-93955 | 4/2007 |
| JP | 2007-108531 | 4/2007 |
| JP | 2007-178846 | 7/2007 |
| JP | 2007-232918 | 9/2007 |
| JP | 2007-256325 | 10/2007 |
| JP | 2008-64777 | 3/2008 |
| JP | 2008-76513 | 4/2008 |
| JP | 2008-122492 | 5/2008 |
| JP | 2008-145501 | 6/2008 |

* cited by examiner

*Primary Examiner*—William C Choi
(74) *Attorney, Agent, or Firm*—Dickstein Shapiro LLP

(57) ABSTRACT

A zoom lens comprises a first lens group G1, which includes a negative focal length, a second lens group G2, which includes a positive focal length, a third lens group G3, which includes a negative focal length, a fourth lens group G4, which includes a positive focal length, and a fifth lens group G5, which includes a positive focal length, in order from nearest to furthest from a photographic subject, or with a sixth lens group G6, which includes a negative focal length, installed as an anchored lens group between the fifth lens group and an image site of the camera apparatus. The first lens group comprises a reflective optical element, the third lens group G3 comprises an aperture stop, either on a side thereof in a direction of the photographic subject, on a side in a direction of the image site, or within the third lens group, and, when magnifying from a short focus end to a long focus end, an interval between the first lens group and the second lens group is reduced, an interval between the second lens group and the third lens group is increased, an interval between the third lens group and the fourth lens group is reduced, an interval between the fourth lens group and the fifth lens group is increased, and the fifth lens group moves toward the imaging site.

11 Claims, 16 Drawing Sheets

ZOOM LENS, CAMERA APPARATUS, AND PORTABLE INFORMATION TERMINAL APPARATUS

CROSS-REFERENCE TO THE RELATED APPLICATION

This application is based on and claims priority from Japanese Patent Application No. 2007-235775, filed on Sep. 11, 2007, the disclosure of which is incorporated herein by reference in its entirety.

BACKGROUND OF THE INVENTION

1. Field of the Invention

The present invention relates to a zoom lens, a camera apparatus, and a portable information terminal device.

2. Description of the Related Art

Digital cameras are experiencing an increase in image quality, as well as greater miniaturization, an increasingly wide angle of photography, and a greater magnification of an image that is taken with such a device. A demand exists for a high performance, miniature, wide angle, large aperture digital camera that includes a zoom lens with a 6× or greater magnification as a photographic lens thereof, and that is capable of achieving a high image quality that supports a photosensitive element in excess of 10 megapixels.

Whereas Japanese Patent Application Publication No. 2004-271937 discloses a configuration of five lens groups, which are arranged negative focal length-positive focal length-negative focal length-positive focal length-positive focal length, in order from nearest to furthest from a photographic subject, and which closely approaches a 5× magnification, such as a zoom lens according to the present invention. Such a configuration is not capable, however, of fulfilling the extant demand for a magnification of 6× or greater.

In addition, a configuration is known that installs a reflective photosensitive element within the zoom lens, thereby refracting a light path therein, in order to respond to the increasing miniaturization of the digital camera. Japanese Patent Application Publication No. 2004-102219 and Japanese Patent Application Publication No. 2005-338143 disclose an invention thereof that comprises the reflective photosensitive element within the first lens group of the five lens groups of the negative focal length-positive focal length-negative focal length-positive focal length-positive focal length configuration that is described herein. The zoom lens that is disclosed herein, however, achieves a magnification that is only on the order of 3×, making such a configuration incapable of fulfilling the demand for a magnification of 6× or greater.

SUMMARY OF THE INVENTION

It is an object of the present invention to implement a high performance zoom lens that is compliant with a digital camera that is miniaturized and comprises a magnification of 6× or more, as well as 10 megapixels or more, while also supporting a half field angle of 38 degrees or more, and a long focus end F number of 6.0 or less.

To accomplish the above object, a zoom lens according to an embodiment of the present invention includes a first lens group having a negative focal length, a second lens group having a positive focal length, a third lens group having a negative focal length, a fourth lens group having a positive focal length, and a fifth lens group having a positive focal length, which are disposed in order from nearest to furthest from a subject.

The first lens group includes a reflective optical element. The third lens group includes an aperture stop which is disposed in a subject side or an image side of the third lens group or within the third lens group.

When magnifying from a abort focus end to a long focus end, an interval between the first lens group and the second lens group is configured to reduce, an interval between the second lens group and the third lens group is configured to increase, an interval between the third lens group and the fourth lens group is configured to reduce, an interval between the fourth lens group and the fifth lens group is configured to increase, and the fifth lens group is moved toward the subject.

Put another way, the present invention includes a configuration as a zoom lens comprising five lens groups, in order from the photographic subject, as negative focal length-positive focal length-negative focal length-positive focal length-positive focal length, or a zoom lens comprising six lens groups, in order from the photographic subject, as negative focal length-positive focal length-negative focal length-positive focal length-positive focal length-negative focal length. With the six lens group configuration, the sixth lens group, which includes a negative refraction, is positioned as an anchored lens group, and as such, is not displaced when magnifying an image.

When magnifying from a short focus end, i.e., from a wide angle, to the long focus end, i.e., to a telephoto angle, an interval between the first lens group and the second lens group is reduced, an interval between the second lens group and the third lens group is increased, an interval between the third lens group and the fourth lens group is reduced, an interval between the fourth lens group and the fifth lens group is increased, and the fifth lens group is moved toward the subject.

In the present circumstance, the expression "the fifth lens group moves toward the imaging site" refers to a site of the fifth lens group being located more in the direction of the imaging site with the long focus end, i.e., with the telephoto, than with the short focus end, i.e., with the wide angle. Accordingly, the fifth lens group need not necessarily be simply displaced toward the imaging site when the zoom lens magnifies from the short focus end, i.e., from the wide angle, to the long focus end, i.e., to the telephoto.

It is to be understood that it is preferable that the first lens group be anchored in place when performing the magnification operation.

A camera apparatus according to the present invention includes the zoom lens according to the present invention as a photographic zoom lens. The camera apparatus according to the present invention is capable of comprising a function that treats a photographic image as digital information. Put another way, it is possible for a camera apparatus according to the present invention to be implemented as a film camera, and for another camera apparatus according to the present invention to be implemented as a digital camera. It would further be possible for still another camera apparatus according to the present invention to be configured as a photography unit of a portable information terminal device.

When magnifying from the short focus end, i.e., from the wide angle, to the long focus end, i.e., to the telephoto, the zoom lens according to the present invention achieves the high magnification by setting a displacement from the first lens group to the fifth lens group such that a magnification function is borne not only by the second lens group, but by the fifth lens group as well, in order that the interval between the first lens group and the second lens group is reduced, the interval between the second lens group and the third lens group is increased, the interval between the third lens group and the fourth lens group is reduced, the interval between the fourth lens group and the fifth lens group is increased, and the fifth lens group moves toward the subject, as described herein.

Also as described herein, it is preferable that the first lens group be anchored in place with respect to an imaging surface of the camera when performing the magnification operation. Doing so avoids changing an external form of the camera apparatus as a result of a zoom operation when the zoom lens according to the present invention is included within the camera apparatus. As a result, a waterproofing process of the camera apparatus is simpler, and it is also possible to achieve a shorter activation time of the camera apparatus and the zoom lens when taking a photograph, than would be the case with a collapsed type of zoom lens.

BRIEF DESCRIPTION OF THE DRAWINGS

FIG. 17 B is a perspective view showing a back surface of the camera apparatus according to the first embodiment.

DETAILED DESCRIPTION OF THE PREFERRED EMBODIMENTS

Preferred embodiments of the present invention will be explained in detail hereinafter with reference to the accompanying drawings.

Figure 1:
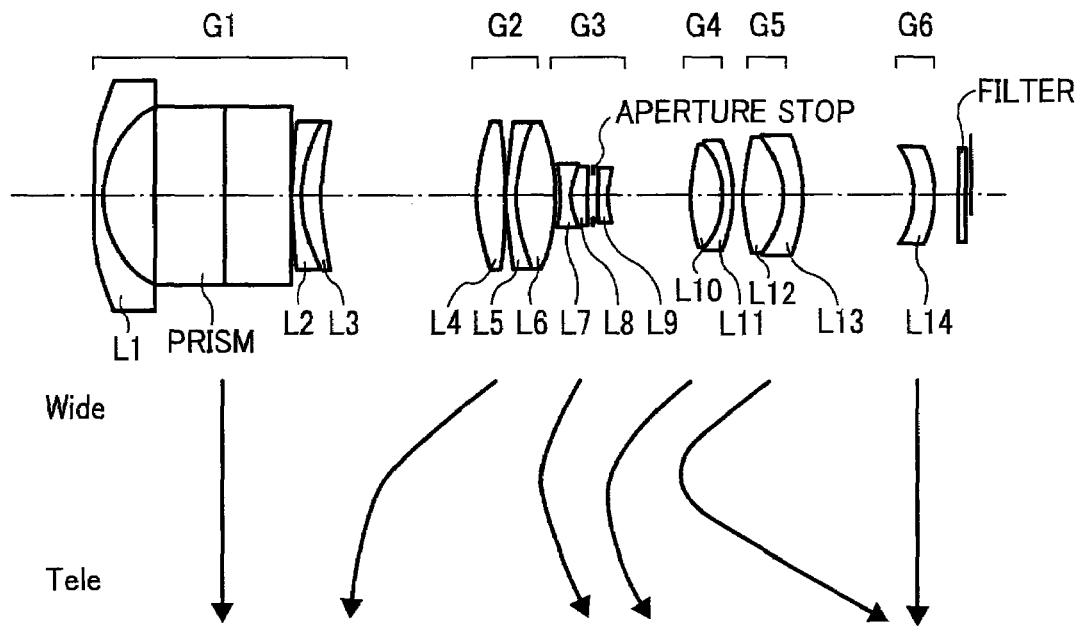
FIG. 1 is a schematic view showing a structure of a zoom lens according to a first embodiment of the present invention.

A zoom lens that is shown in FIG. 1 relates to a zoom lens according to a first embodiment (to be described hereinafter). From left in FIG. 1, a first lens group G1, which includes a negative focal length, a second lens group G2, which includes a positive focal length, a third lens group G3, which includes a negative focal length, a fourth lens group G4, which includes a positive focal length, and a fifth lens group G5, which includes a positive focal length, is installed in order therein from nearest to furthest from a subject, or with a sixth lens group G6, which includes a negative focal length, installed as a fixed lens group between the fifth lens group G5 and an image side of, for example, a camera apparatus, wherein the first lens group G1 includes a reflective optical element, i.e., a prism, and the third lens group G3 comprises an aperture stop. Reference numerals L1 to L14 denote a first lens to a fourteenth lens.

When magnifying from a short focus end, i.e., from a wide angle, to a long focus end, i.e., to a telephoto, an interval between the first lens group G1 and the second lens group G2 is reduced, an interval between the second lens group G2 and the third lens group G3 is increased, an interval between the third lens group G3 and the fourth lens group G4 is reduced, an interval between the fourth lens group G4 and the fifth lens group G5 is increased, and the fifth lens group G5 is moved toward the subject.

Figure 2:
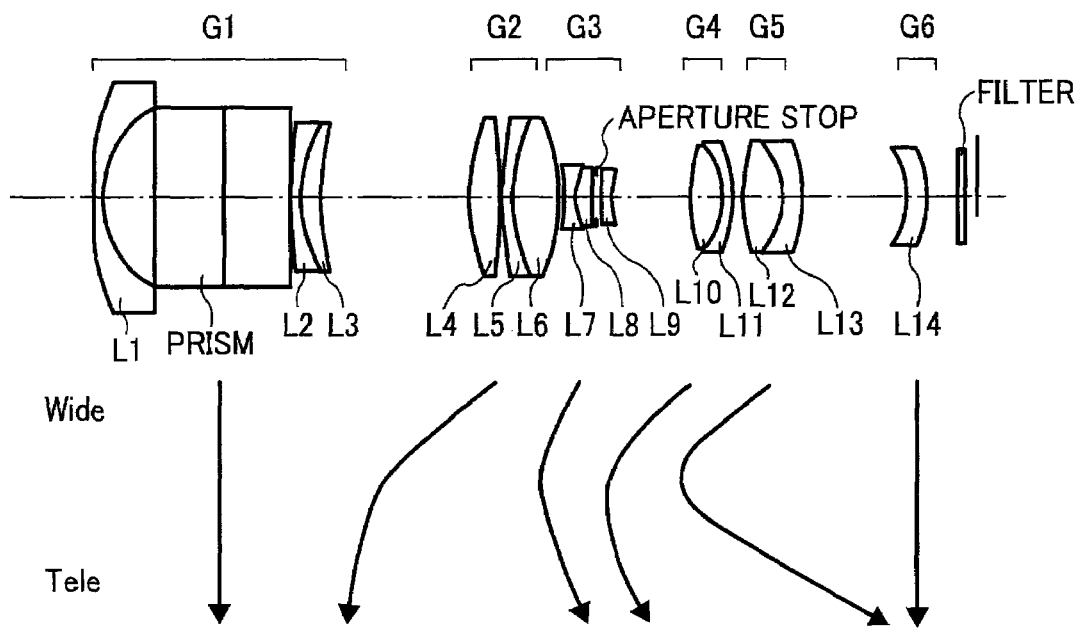
FIG. 2 is a schematic view showing a structure of a zoom lens according to a second embodiment of the present invention.

A zoom lens that is shown in FIG. 2 relates to a zoom lens according to a second embodiment (to be described hereinafter). From left in FIG. 2, a first lens group G1, which includes a negative focal length, a second lens group G2, which includes a positive focal length, a third lens group G3, which includes a negative focal length, a fourth lens group G4, which includes a positive focal length, and a fifth lens group G5, which includes a positive focal length, is installed in order therein from nearest to furthest from a photographic subject, or with a sixth lens group G6, which includes a negative focal length, installed as an anchored lens group between the fifth lens group G5 and the image side of the camera apparatus, wherein the first lens group G1 comprises a reflective optical element, i.e., a prism, and the third lens group G3 includes an aperture stop. Reference numerals L1 to L14 denote a first lens to a fourteenth lens.

When magnifying from a short focus end, i.e., from a wide angle, to a long focus end, i.e., to a telephoto, an interval between the first lens group G1 and the second lens group G2 is reduced, an interval between the second lens group G2 and the third lens group G3 is increased, an interval between the third lens group G3 and the fourth lens group G4 is reduced, an interval between the fourth lens group G4 and the fifth lens group G5 is increased, and the fifth lens group G5 moves toward the imaging site.

Figure 3:
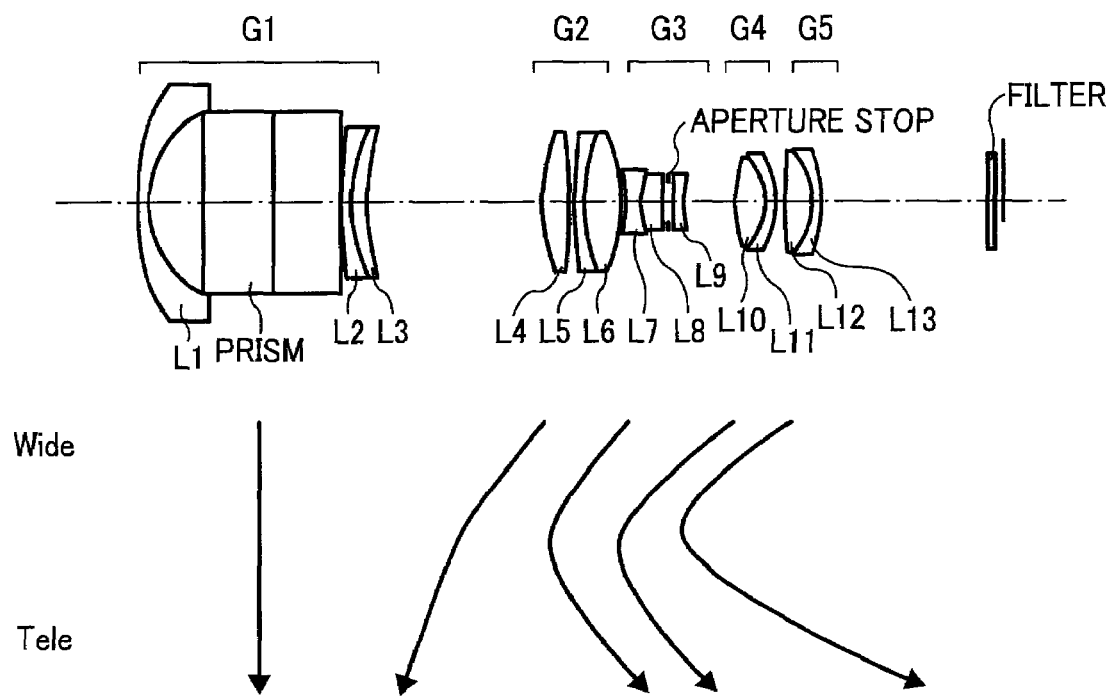
FIG. 3 is a schematic view showing a structure of a zoom lens according to a third embodiment of the present invention.

A zoom lens that is depicted in FIG. 3 relates to a zoom lens according to a third embodiment (to be described hereinafter). From left in FIG. 3, a first lens group G1, which includes a negative focal length, a second lens group G2, which includes a positive focal length, a third lens group G3, which includes a negative focal length, a fourth lens group G4, which includes a positive focal length, and a fifth lens group G5, which includes a positive focal length, is installed in order therein from nearest to furthest from a photographic subject, wherein the first lens group G1 comprises a reflective optical element, i.e., a prism, and the third lens group G3 includes an aperture stop. Reference numerals L1 to L13 denote a first lens to a fourteenth lens.

When magnifying from a short focus end, i.e., from a wide angle, to a long focus end, i.e., to a telephoto, an interval between the first lens group G1 and the second lens group G2 is reduced, an interval between the second lens group G2 and the third lens group G3 is increased, an interval between the third lens group G3 and the fourth lens group G4 is reduced, an interval between the fourth lens group G4 and the fifth lens group G5 is increased, and the fifth lens group G5 is moved toward the subject.

Figure 4:
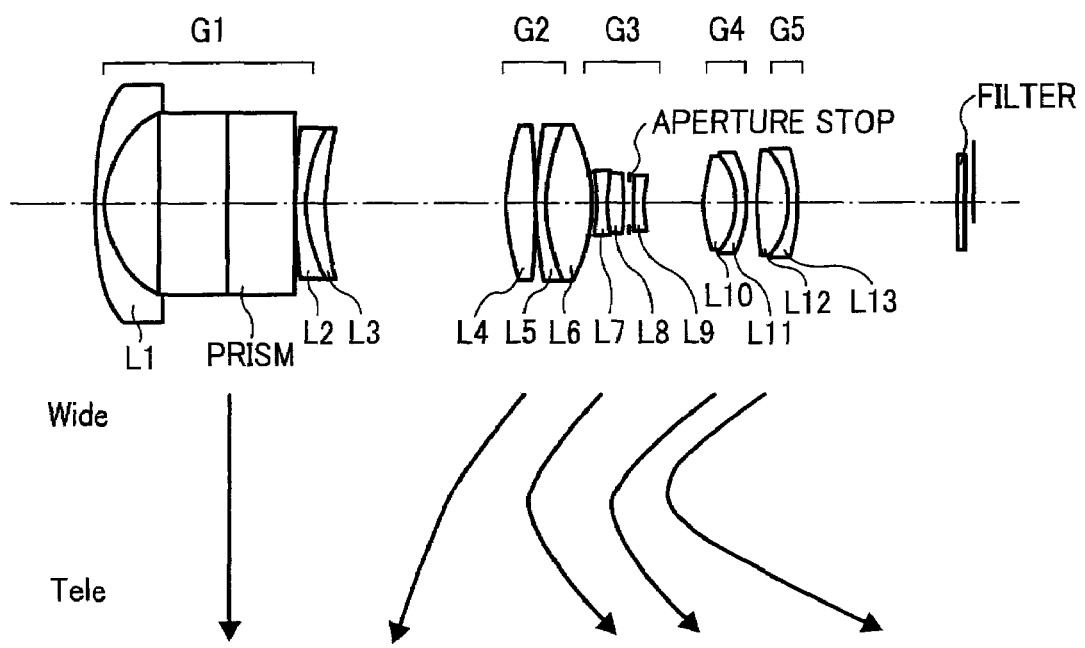
FIG. 4 is a schematic view showing a structure of a zoom lens according to a fourth embodiment of the present invention.

A zoom lens that is depicted in FIG. 4 relates to a zoom lens according to a fourth embodiment (to be described hereinafter). From left in FIG. 4, a first lens group G1, which includes a negative focal length, a second lens group G2, which includes a positive focal length, a third lens group G3, which includes a negative focal length, a fourth lens group G4, which includes a positive focal length, and a fifth lens group G5, which includes a positive focal length, is installed in order therein from nearest to furthest from a photographic subject, wherein the first lens group G1 comprises a reflective optical element, i.e., a prism, and the third lens group G3 includes an aperture stop. Reference numerals L1 to L13 denote a first lens to a fourteenth lens.

When magnifying from a short focus end, i.e., from a wide angle, to a long focus end, i.e., to a telephoto, an interval between the first lens group G1 and the second lens group G2 is reduced, an interval between the second lens group G2 and the third lens group G3 is increased, an interval between the third lens group G3 and the fourth lens group G4 is reduced, an interval between the fourth lens group G4 and the fifth lens group G5 is increased, and the fifth lens group G5 is moved toward the subject.

According to the first through the fourth embodiment (to be described hereinafter), as shown in FIG. 1 to FIG. 4, any of the present invention according to the first through the fourth embodiment satisfies a conditional expression 1 to 3. In addition, a focusing is performed by the fifth lens group, the fifth lens group G5 comprises a lens with a positive focal length and a lens with a negative focal length, and the lens with the positive focal length therein is cemented to the lens with the negative focal length therein.

Figure 17A:
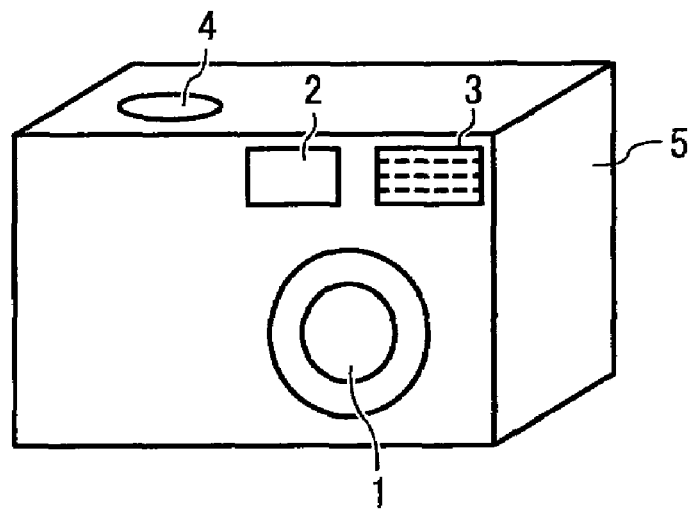
FIG. 17 A is a perspective view showing a front surface of a camera apparatus according to the first embodiment.
Figure 17B:
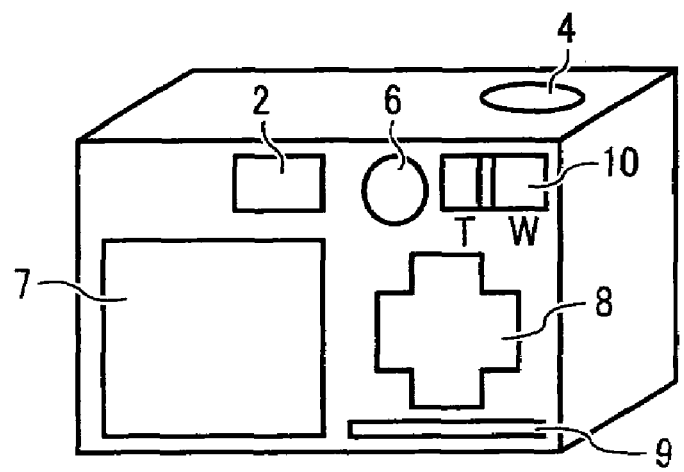

FIG. 17 illustrates a camera apparatus according to the first embodiment.

FIG. 17 A illustrates a front face and an upper face, and FIG. 17 B illustrates a rear face, of the camera apparatus according to the first embodiment. The camera apparatus includes, as a photographic lens 1, the zoom lens according to the present invention, i.e., the zoom lens that corresponds according to the first to the fourth embodiments (to be described hereinafter), as a photographic zoom lens of the camera apparatus.

Reference numeral 2 denotes a viewfinder, reference numeral 3 denotes a flash lamp, reference numeral 4 denotes a shutter button, reference numeral 5 denotes a casing for a camera body, reference numeral 6 denotes a power a switch, reference numeral 7 denotes an LCD monitor, reference numeral 8 denotes a function operation switch, reference numeral 9 denotes a memory card slot, and reference numeral 10 denotes a zoom function control unit.

In the present circumstance, a zoom lens, with a degree of change of interval between the fourth lens group and the fifth lens group when magnifying from the short focus end, i.e., the wide angle, to the long focus end, i.e., the telephoto, of m45, and a maximum image resolution of Y', satisfies a conditional expression 1, as follows:

$$1.0 < m45/Y' < 6.0 \quad (1)$$

In addition, with respect to the zoom lend, wherein the focal length of the fifth lens group is f5, and with the maximum image resolution of Y', satisfies a conditional expression 2, as follows:

$$4 < f5/Y' < 15 \quad (2)$$

In addition, with respect to the zoom lens, the focusing is performed by the fifth lens group.

In addition, with respect to the zoom lens, wherein a lateral magnification of the fifth lens group with respect to the short focus end, i.e., the wide angle, is b5w, and the lateral magnification of the fifth lens group with respect to the long focus end, i.e., the telephoto, is b5t, satisfies a conditional expression 3, as follows:

$$1.2 < b5t/b5w < 2.5 \quad (3)$$

In addition, with respect to the zoom lens, the fifth lens group comprises the lens with the positive focal length and the lens with the negative focal length.

Furthermore, with respect to the zoom lens, when magnifying from the short focus end, i.e., the wide angle, to the long focus end, i.e., the telephoto, the fifth lens group first moves toward the photographic subject, and then toward the imaging site.

If a lower bound value of the conditional expression (1) is exceeded, it becomes necessary to increase a power of the fifth lens group in order that the fifth lens group maintains the magnification function thereof, making it difficult in turn to correct a defect such as a coma aberration. In addition, if an upper bound value of the conditional expression (1) is exceeded, the degree of movement of the fifth lens group grows when magnifying from the short focus end, i.e., the wide angle, to the long focus end, i.e., the telephoto, and thus, the zoom lens increases in size.

Thus, it is preferable that the parameter m45/Y' of the conditional expression (1) instead satisfy a conditional expression (1A), as follows:

$$2.0 < m45/Y' < 6.0 \quad (1A)$$

If an upper bound value of the conditional expression (2) is exceeded, a range of movement of the fifth lens group grows when magnifying from the short focus end, i.e., the wide angle, to the long focus end, i.e., the telephoto, and thus, the zoom lens increases in size. If a lower bound value of the conditional expression (2) is exceeded, it becomes difficult to correct the defect such as the coma aberration.

If an upper bound value of the conditional expression (3) is exceeded, the range of movement of the fifth lens group grows when magnifying from the short focus end, i.e., the wide angle, to the long focus end, i.e., the telephoto, and thus, the zoom lens increases in size. If a lower bound value of the conditional expression (3) is exceeded, a magnification load upon the fifth lens group is reduced, and a large demand is made upon a magnification function of the second lens group, thus making it difficult to correct the aberration within the zoom region.

Figure 18:
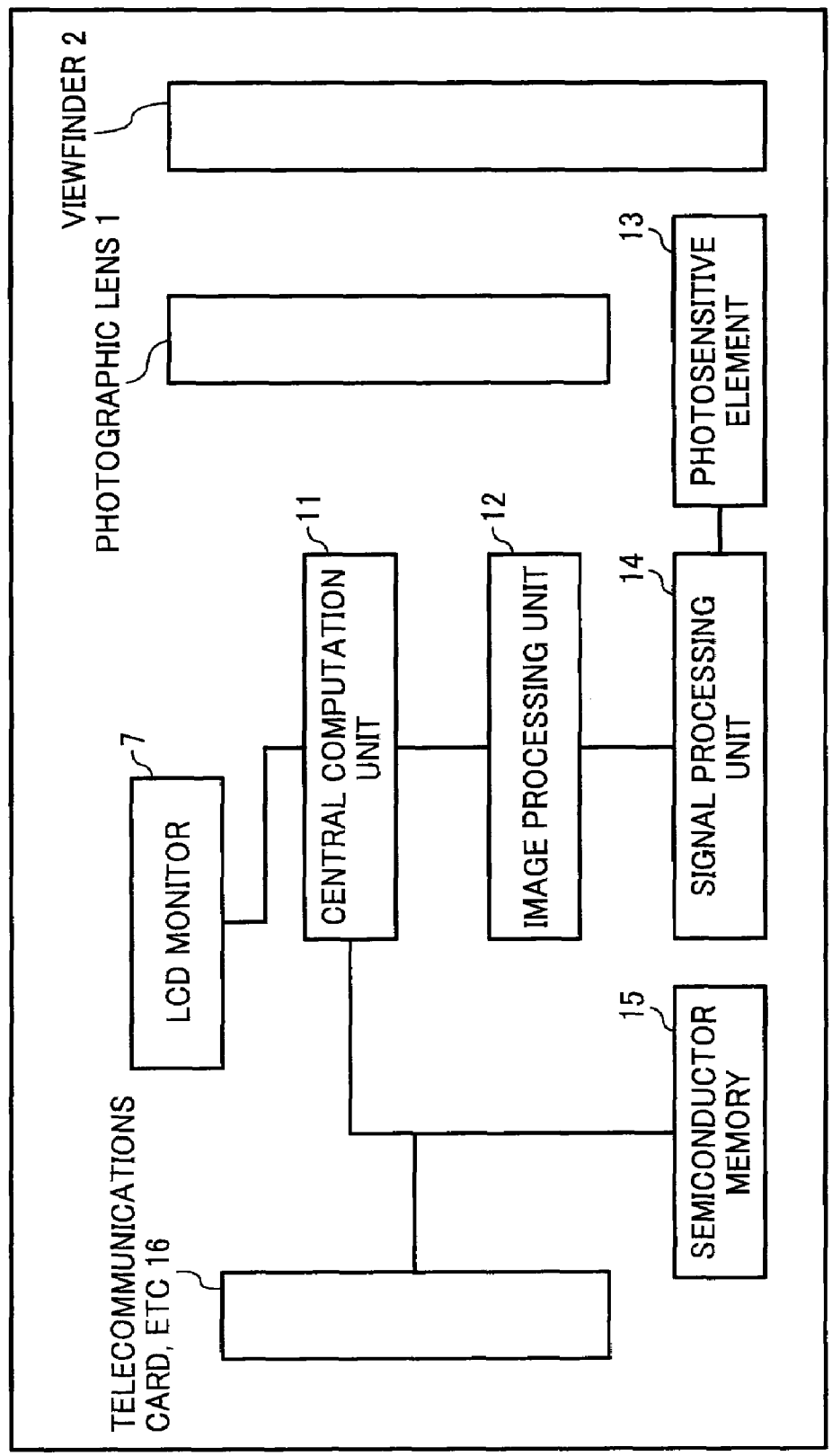
FIG. 18 is a view showing a system configuration of the camera apparatus.

FIG. 18 illustrates a system configuration of the camera apparatus that is depicted in FIG. 17.

As shown in FIG. 18, the camera apparatus comprises a photographic lens 1 and a photosensitive element 13, and is configured such that an image of a subject, for example, a photographic subject, which is formed by the photographic lens 1, is read in by the photosensitive element 13, and an output of the photosensitive element 13 is processed, and converted into a digital information, by a signal processing unit 14, which receives a control from a central computation unit 11. Put another way, the camera apparatus includes a function that converts a photographic image into digital information. In addition, it is possible to carry out a communication of data external to the camera apparatus by way of such as a telecommunications card 16. Accordingly, the camera apparatus includes a specification as a portable information terminal device.

Following is a detailed description according to four examples of the zoom lens.

A definition of a reference notation according to each respective example is as follows:

f: overall focal length
F: F number
ω: half field angle
R: Radius of Curvature
D: Lattice Spacing
Nd: Index of Refraction
vd: Abbe Number
K: Conical Constant of Aspherical Lens Surface
A4: Quartic Aspherical Lens Surface Coefficient
A6: Sextic Aspherical Lens Surface Coefficient
A8: Octic Aspherical Lens Surface Coefficient
A10: Dectic Aspherical Lens Surface Coefficient An aspherical lens surface is represented by a known equation, as follows:

$$X = CH^2/\{1+\sqrt{(1-(1+K)C^2H^2)}\} + A4 \cdot H^4 + A6 \cdot H^6 + A8 \cdot H^8 + A10 \cdot H^{10}$$

wherein C is a reciprocal of a paraxial radius of curvature, i.e., a paraxial curvature, H is a height from an optical axis, and the conical constant and each respective aspherical lens surface coefficient is employed therein.

FIRST EXAMPLE f=5.20-34.99, F=3.54-4.23, so ω=40.27-6.64

A data according to the first embodiment is shown in Table 1, following:

TABLE 1

|  | R | D | $N_d$ | $v_d$ |  |
|---|---|---|---|---|---|
| 1* | 876.359 | 1.00 | 1.86400 | 40.58 | 1ST LENS |
| 2* | 12.574 | 5.17 |  |  |  |
| 3 | ∞ | 6.60 | 1.92286 | 18.90 | PRISM |
| 4 | ∞ | 6.60 | 1.92286 | 18.90 | PRISM |
| 5 | ∞ | 0.10 |  |  |  |
| 6 | 62.088 | 1.00 | 1.83400 | 37.16 | 2ND LENS |
| 7 | 14.600 | 1.88 | 1.80518 | 25.42 | 3RD LENS |
| 8 | 29.342 | VARIABLE (A) |  |  |  |
| 9* | 18.221 | 2.77 | 1.80610 | 40.88 | 4TH LENS |
| 10 | −55.564 | 0.10 |  |  |  |
| 11 | 37.802 | 1.00 | 1.84666 | 23.78 | 5TH LENS |
| 12 | 15.727 | 3.84 | 1.49700 | 81.54 | 6TH LENS |
| 13 | −18.243 | VARIABLE (B) |  |  |  |
| 14 | −17.979 | 1.00 | 1.80610 | 40.88 | 7TH LENS |
| 15 | 6.859 | 0.17 |  |  |  |
| 16 | 7.697 | 1.55 | 1.80809 | 22.76 | 8TH LENS |
| 17 | −72.436 | 0.50 |  |  |  |
| 18 | APERTURE STOP | 0.50 |  |  |  |
| 19 | 371.376 | 1.00 | 1.74320 | 49.29 | 9TH LENS |
| 20* | 11.440 | VARIABLE (C) |  |  |  |

TABLE 1-continued

| 21* | 16.989 | 3.13 | 1.49700 | 81.54 | 10TH LENS |
|---|---|---|---|---|---|
| 22 | −8.024 | 1.00 | 1.80518 | 25.42 | 11TH LENS |
| 23 | −13.315 | VARIABLE (D) |  |  |  |
| 24 | 21.068 | 3.82 | 1.48749 | 70.24 | 12TH LENS |
| 25 | −8.624 | 2.00 | 1.74950 | 35.28 | 13TH LENS |
| 26 | −15.551 | VARIABLE (E) |  |  |  |
| 27 | −8.000 | 2.00 | 1.51633 | 64.14 | 14TH LENS |
| 28* | −12.237 | 2.30 |  |  |  |
| 29 | ∞ | 0.80 | 1.50000 | 64.00 | EACH RESPECTIVE FILTER |
| 30 | ∞ |  |  |  |  |

Aspherical Lens Surface

| First Surface: | K = 0.0 | A4 = 2.23E−04 | A6 = −9.31E−07 |
|---|---|---|---|
|  | A8 = 1.06E−09 | A10 = 1.53E−12 |  |
| Second Surface: | K = 0.0 | A4 = 2.00E−04 | A6 = 4.28E−07 |
|  | A8 = 1.38E−08 | A10 = −1.76E−10 |  |
| Ninth Surface: | K = 0.0 | A4 = −5.87E−05 | A6 = 4.70E−08 |
|  | A8 = −6.47E−10 | A10 = 3.54E−12 |  |
| Twentieth Surface: | K = 0.0 | A4 = −3.27E−04 | A6 = 1.74E−06 |
|  | A8 = −7.18E−07 | A10 = 2.73E−08 |  |
| Twenty-first Surface: | K = 0.0 | A4 = −4.60E−05 | A6 = 1.97E−06 |
|  | A8 = −6.33E−08 | A10 = 1.57E−09 |  |
| Twenty-eighth Surface: | K = 0.0 | A4 = −2.68E−04 | A6 = 1.63E−05 |
|  | A8 = −9.89E−07 | A10 = 1.71E−08 |  |

Change of Interval

A data of a change of interval is shown in Table 2, following:

TABLE 2

|  | Wide | Mean | Tele |
|---|---|---|---|
| FOCAL LENGTH | f = 5.20 | f = 13.49 | f = 34.99 |
| F NUMBER | 3.54 | 4.77 | 5.23 |
| A | 15.2265 | 3.7898 | 0.5066 |
| B | 0.4999 | 4.2025 | 16.1505 |
| C | 8.0965 | 1.4275 | 0.4971 |
| D | 0.9994 | 9.3119 | 17.7030 |
| E | 10.7991 | 16.8947 | 0.7650 |

A value that is required for calculating the conditional expression is shown in Table 3, following:

TABLE 3

| Y' | 4.2 |
|---|---|
| m45 | 16.704 |
| f5 | 24.879 |
| b5t | 0.759 |
| b5w | 0.355 |

A value of the parameter of the conditional expression is shown in Table 4 following:

TABLE 4

| m45/Y' | 3.977 |
|---|---|
| f5/Y' | 5.924 |
| b5t/b5w | 2.138 |

SECOND EXAMPLE f=5.00-34.99, F=3.46-5.24, ω=40.22-6.64

A data according to the second example is shown in Table 5, following:

TABLE 5

|   | R | D | $N_d$ | $v_d$ |   |
|---|---|---|---|---|---|
| 1* | 381.594 | 1.00 | 1.86400 | 40.58 | 1ST LENS |
| 2* | 12.229 | 5.10 | | | |
| 3 | ∞ | 6.60 | 1.92286 | 18.90 | PRISM |
| 4 | ∞ | 6.60 | 1.92286 | 18.90 | PRISM |
| 5 | ∞ | 0.10 | | | |
| 6 | 62.037 | 1.00 | 1.83400 | 37.16 | 2ND LENS |
| 7 | 14.853 | 1.93 | 1.80518 | 25.42 | 3RD LENS |
| 8 | 27.423 | VARIABLE (A) | | | |
| 9* | 18.418 | 3.14 | 1.80610 | 40.88 | 4TH LENS |
| 10 | −53.639 | 0.10 | | | |
| 11 | 38.555 | 1.00 | 1.84666 | 23.78 | 5TH LENS |
| 12 | 16.656 | 4.51 | 1.49700 | 81.54 | 6TH LENS |
| 13 | −17.895 | VARIABLE (B) | | | |
| 14 | −17.457 | 1.00 | 1.80610 | 40.88 | 7TH LENS |
| 15 | 6.860 | 0.15 | | | |
| 16 | 7.409 | 1.60 | 1.80809 | 22.76 | 8TH LENS |
| 17 | −77.979 | 0.50 | | | |
| 18 | APERTURE STOP | 0.50 | | | |
| 19 | 100.949 | 1.00 | 1.74320 | 49.29 | 9TH LENS |
| 20* | 10.855 | VARIABLE (C) | | | |
| 21* | 14.650 | 3.27 | 1.49700 | 81.54 | 10TH LENS |
| 22 | −8.000 | 1.00 | 1.80518 | 25.42 | 11TH LENS |
| 23 | −12.868 | VARIABLE (D) | | | |
| 24 | 22.121 | 3.83 | 1.48749 | 70.24 | 12TH LENS |
| 25 | −8.000 | 2.00 | 1.74950 | 35.28 | 13TH LENS |
| 26 | −14.562 | VARIABLE (E) | | | |
| 27 | −8.000 | 2.00 | 1.51633 | 64.14 | 14TH LENS |
| 28* | −12.389 | 3.20 | | | |
| 29 | ∞ | 0.80 | 1.50000 | 64.00 | EACH RESPECTIVE FILTER |
| 30 | ∞ | | | | |

Aspherical Lens Surface

| First Surface: | K = 0.0 | A4 = 2.07E−04 | A6 = −1.09E−06 |
| --- | --- | --- | --- |
|  | A8 = 4.07E−09 | A10 = −7.68E−12 |  |
| Second Surface: | K = 0.0 | A4 = 1.71E−04 | A6 = 2.81E−07 |
|  | A8 = 3.63E−09 | A10 = −5.46E−12 |  |
| Ninth Surface: | K = 0.0 | A4 = −5.88E−05 | A6 = 4.39E−08 |
|  | A8 = −5.92E−10 | A10 = 2.95E−12 |  |
| Twentieth Surface: | K = 0.0 | A4 = −3.29E−04 | A6 = 6.75E−06 |
|  | A8 = −1.50E−06 | A10 = 7.97E−08 |  |
| Twenty-first Surface: | K = 0.0 | A4 = −7.10E−05 | A6 = 7.85E−07 |
|  | A8 = 1.80E−08 | A10 = 2.49E−10 |  |
| Twenty-eighth Surface: | K = 0.0 | A4 = −1.97E−04 | A6 = 4.671E−06 |
|  | A8 = −2.14E−07 | A10 = 7.10E−10 |  |

Change of Interval

A data of a change of interval is shown in Table 6, following:

TABLE 6

|   | Wide | Mean | Tele |
|---|---|---|---|
| FOCAL LENGTH | f = 5.20 | f = 13.49 | f = 34.98 |
| F NUMBER | 3.46 | 5.24 | 4.98 |
| A | 14.2127 | 3.6535 | 0.5000 |
| B | 0.5000 | 3.3628 | 17.4105 |
| C | 7.4701 | 1.1955 | 0.5000 |
| D | 1.0000 | 5.9723 | 14.0000 |
| E | 9.9115 | 18.9102 | 0.6837 |

A value that is required for calculating the conditional expression is shown in Table 7, following:

TABLE 7

| Y' | 4.2 |
| --- | --- |
| m45 | 13.000 |
| f5 | 24.867 |
| b5t | 0.730 |
| b5w | 0.357 |

A value of the parameter of the conditional expression is shown in Table 8, following:

TABLE 8

| m45/Y' | 3.095 |
| --- | --- |
| f5/Y' | 5.921 |
| b5t/b5w | 2.044 |

THIRD EXAMPLE f=5.20-34.99, F=3.82-5.92, ω=40.28-6.82

A data according to the third example is shown in Table 9, following:

TABLE 9

|   | R | D | $N_d$ | $v_d$ |   |
|---|---|---|---|---|---|
| 1* | 83.828 | 1.01 | 1.86400 | 40.58 | 1ST LENS |
| 2* | 12.114 | 5.90 | | | |
| 3 | ∞ | 7.00 | 1.92286 | 18.90 | PRISM |
| 4 | ∞ | 7.00 | 1.92286 | 18.90 | PRISM |
| 5 | ∞ | 0.10 | | | |
| 6 | 56.037 | 1.00 | 1.83400 | 37.16 | 2ND LENS |
| 7 | 15.676 | 1.69 | 1.80518 | 25.42 | 3RD LENS |
| 8 | 25.772 | VARIABLE (A) | | | |
| 9* | 18.579 | 2.83 | 1.80610 | 40.88 | 4TH LENS |
| 10 | −67.128 | 0.42 | | | |
| 11 | 49.021 | 1.00 | 1.84666 | 23.78 | 5TH LENS |
| 12 | 19.459 | 3.91 | 1.49700 | 81.54 | 6TH LENS |
| 13 | −17.736 | VARIABLE (B) | | | |
| 14* | −13.836 | 1.54 | 1.80610 | 40.88 | 7TH LENS |
| 15 | 9.306 | 0.10 | | | |
| 16 | 8.652 | 2.30 | 1.80809 | 22.76 | 8TH LENS |
| 17 | −29.054 | 0.50 | | | |
| 18 | APERTURE STOP | 0.50 | | | |
| 19 | −18.647 | 1.00 | 1.74400 | 44.79 | 9TH LENS |
| 20 | 12.168 | VARIABLE (C) | | | |
| 21* | 13.985 | 3.11 | 1.49700 | 81.54 | 10TH LENS |
| 22 | −6.500 | 1.00 | 1.80518 | 25.42 | 11TH LENS |
| 23 | −9.513 | VARIABLE (D) | | | |
| 24* | 138.772 | 2.88 | 1.48749 | 70.24 | 12TH LENS |
| 25 | −7.595 | 1.00 | 1.74950 | 35.28 | 13TH LENS |
| 26 | −14.566 | VARIABLE (E) | | | |
| 27 | ∞ | 0.80 | 1.50000 | 64.00 | EACH RESPECTIVE FILTER |
| 28 | ∞ | | | | |

Aspherical Lens Surface

| First Surface: | K = 0.0 | A4 = 2.33E−04 | A6 = −1.75E−06 |
| --- | --- | --- | --- |
|  | A8 = 9.16E−09 | A10 = −1.91E−11 |  |
| Second Surface: | K = 0.0 | A4 = 2.28E−04 | A6 = 4.09E−08 |
|  | A8 = −1.48E−08 | A10 = 2.12E−10 |  |
| Ninth Surface: | K = 0.0 | A4 = −4.95E−05 | A6 = 1.07E−08 |
|  | A8 = −5.92E−10 | A10 = 3.06E−12 |  |
| Fourteenth Surface: | K = 0.0 | A4 = 1.94E−04 | A6 = −4.86E−06 |
|  | A8 = 3.70E−07 | A10 = −1.71E−08 |  |
| Twenty-first Surface: | K = 0.0 | A4 = −3.21E−04 | A6 = 1.03E−06 |
|  | A8 = 2.34E−07 | A10 = −7.55E−09 |  |

TABLE 9-continued

| Twenty-fourth Surface: | K = 0.0 A8 = −1.12E−07 | A4 = 1.13E−04 A10 = 2.76E−09 | A6 = 2.21E−06 |
|---|---|---|---|

A data of a change of interval is shown in Table 10, following:

TABLE 10

|  | Wide | Mean | Tele |
|---|---|---|---|
| FOCAL LENGTH | f = 5.20 | f = 13.50 | f = 34.99 |
| F NUMBER | 3.82 | 5.92 | 5.10 |
| A | 18.3932 | 7.6102 | 0.5000 |
| B | 0.5000 | 1.6541 | 17.5777 |
| C | 5.4170 | 0.5000 | 0.5000 |
| D | 1.0000 | 1.5933 | 20.1524 |
| E | 17.2136 | 31.1264 | 3.7874 |

A value that is required for calculating the conditional expression is shown in Table 11, following:

TABLE 11

| Y' | 4.2 |
|---|---|
| m45 | 19.152 |
| f5 | 47.037 |
| b5t | 0.900 |
| b5w | 0.614 |

A value of the parameter of the conditional expression is shown in Table 12, following:

TABLE 12

| m45/Y' | 4.560 |
|---|---|
| f5/Y' | 11.199 |
| b5t/b5w | 1.465 |

FOURTH EXAMPLE f=5.20-35.00, F=3.72-5.89 ω=40.09-6.76

A data according to the fourth example is shown in Table 13, following:

TABLE 13

|  | R | D | $N_d$ | $v_d$ |  |
|---|---|---|---|---|---|
| 1* | −8856.997 | 1.00 | 1.86400 | 40.58 | 1ST LENS |
| 2* | 12.948 | 5.30 |  |  |  |
| 3 | ∞ | 6.60 | 1.92286 | 18.90 | PRISM |
| 4 | ∞ | 6.60 | 1.92286 | 18.90 | PRISM |
| 5 | ∞ | 0.10 |  |  |  |
| 6 | 44.558 | 1.00 | 1.83400 | 37.16 | 2ND LENS |
| 7 | 13.687 | 1.88 | 1.80518 | 25.42 | 3RD LENS |
| 8 | 22.701 | VARIABLE (A) |  |  |  |
| 9* | 18.333 | 2.85 | 1.80610 | 40.88 | 4TH LENS |
| 10 | −84.847 | 0.10 |  |  |  |
| 11 | 38.401 | 1.00 | 1.84666 | 23.78 | 5TH LENS |
| 12 | 18.002 | 4.43 | 1.49700 | 81.54 | 6TH LENS |
| 13 | −16.661 | VARIABLE (B) |  |  |  |
| 14 | −13.135 | 1.00 | 1.80610 | 40.88 | 7TH LENS |
| 15 | 20.059 | 0.10 |  |  |  |
| 16 | 12.944 | 1.53 | 1.80809 | 22.76 | 8TH LENS |
| 17 | −24.619 | 0.50 |  |  |  |
| 18 | APERTURE STOP | 0.50 |  |  |  |
| 19 | −45.768 | 1.00 | 1.74320 | 49.29 | 9TH LENS |
| 20* | 7.508 | VARIABLE (C) |  |  |  |

TABLE 13-continued

| 21* | 13.038 | 3.17 | 1.49700 | 81.54 | 10TH LENS |
|---|---|---|---|---|---|
| 22 | −7.000 | 1.00 | 1.80518 | 25.42 | 11TH LENS |
| 23 | −10.526 | VARIABLE (D) |  |  |  |
| 24* | 47.772 | 3.05 | 1.48749 | 70.24 | 12TH LENS |
| 25 | −7.939 | 1.00 | 1.74950 | 35.28 | 13TH LENS |
| 26 | −16.987 | VARIABLE (E) |  |  |  |
| 27 | ∞ | 0.80 | 1.50000 | 64.00 | EACH RESPECTIVE FILTER |
| 28 | ∞ |  |  |  |  |

Aspherical Lens Surface

| First Surface: | K = 0.0 A8 = 1.07E−08 | A4 = 2.95E−04 A10 = −2.65E−11 | A6 = −2.01E−06 |
|---|---|---|---|
| Second Surface: | K = 0.0 A8 = 1.29E−08 | A4 = 2.88E−04 A10 = 2.44E−11 | A6 = −2.25E−07 |
| Ninth Surface: | K = 0.0 A8 = −2.59E−10 | A4 = −5.21E−05 A10 = 1.03E−12 | A6 = 1.19E−08 |
| Twentieth Surface: | K = 0.0 A8 = 1.16E−06 | A4 = −4.33E−04 A10 = −7.80E−08 | A6 = −5.36E−06 |
| Twenty-first Surface: | K = 0.0 A8 = 1.49E−07 | A4 = −2.87E−04 A10 = −2.46E−09 | A6 = 7.10E−07 |
| Twenty-fourth Surface: | K = 0.0 A8 = −3.54E−08 | A4 = 1.33E−04 A10 = 2.56E−10 | A6 = 1.36E−06 |

A data of a change of interval is shown in Table 14, following:

TABLE 14

|  | Wide | Mean | Tele |
|---|---|---|---|
| FOCAL LENGTH | f = 5.20 | f = 13.50 | f = 35.00 |
| F NUMBER | 3.72 | 5.89 | 5.14 |
| A | 17.8647 | 7.3474 | 0.5000 |
| B | 0.5000 | 1.3217 | 17.6360 |
| C | 5.8449 | 0.5000 | 0.5000 |
| D | 1.0000 | 2.3403 | 21.4999 |
| E | 15.5014 | 29.1941 | 0.5663 |

A value that is required for calculating the conditional expression is shown in Table 15, following:

TABLE 15

| Y' | 4.2 |
|---|---|
| m45 | 20.500 |
| f5 | 46.193 |
| b5t | 0.951 |
| b5w | 0.627 |

A value of the parameter of the conditional expression is depicted in Table 16, following:

TABLE 16

| m45/Y' | 4.881 |
|---|---|
| f5/Y' | 10.998 |
| b5t/b5w | 1.515 |

It is to be understood that a notation with respect to the aspherical lens surface is scientific notation; i.e., 2.56E-10 is the same as $2.56 \times 10^{-10}$.

Figure 5:
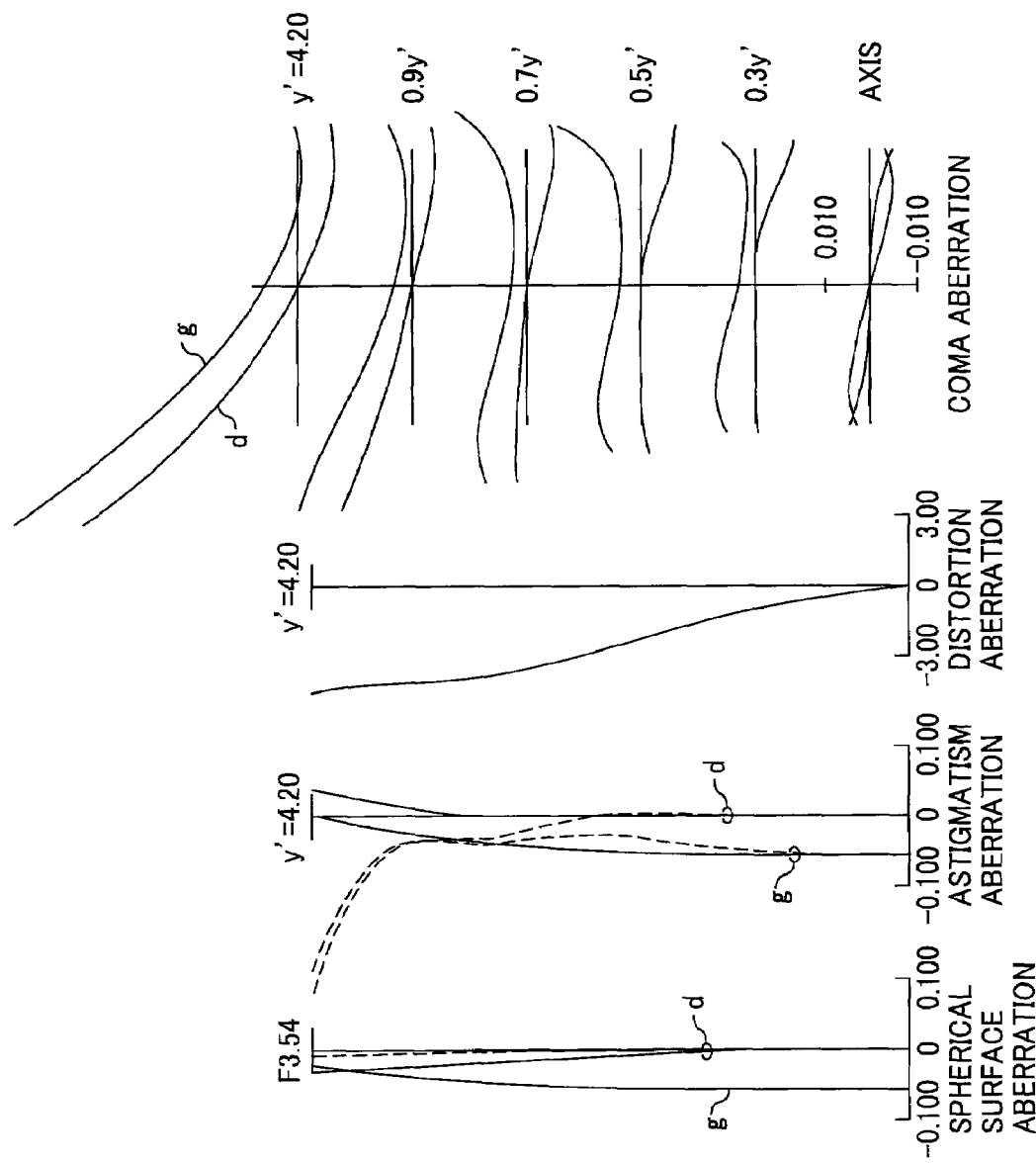
FIG. 5 is a view showing an aberration with respect to a short focus end, i.e., a wide angle, according to the first embodiment.
Figure 6:
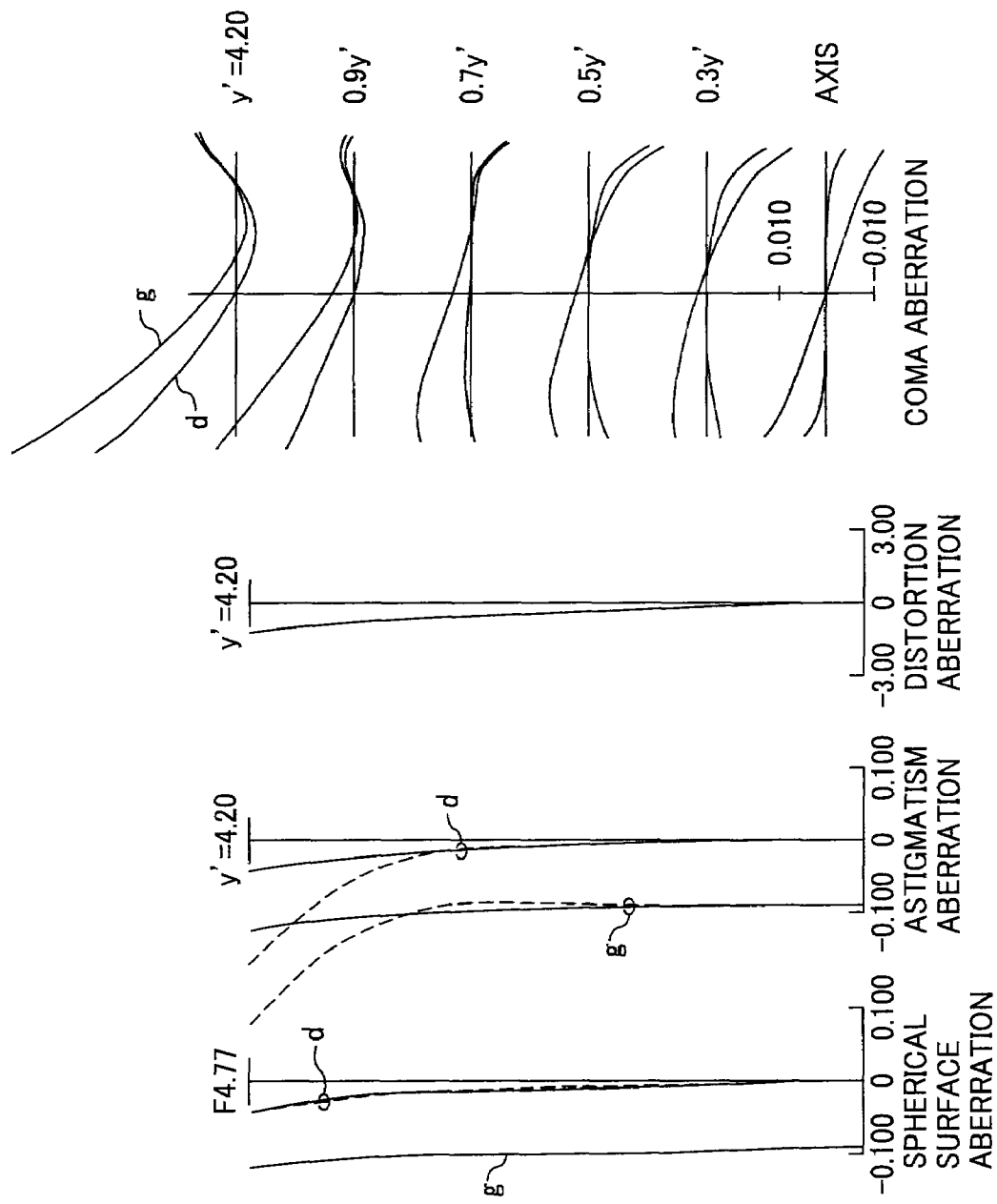
FIG. 6 is a view showing an aberration with respect to a middle focus length according to the first embodiment.
Figure 7:
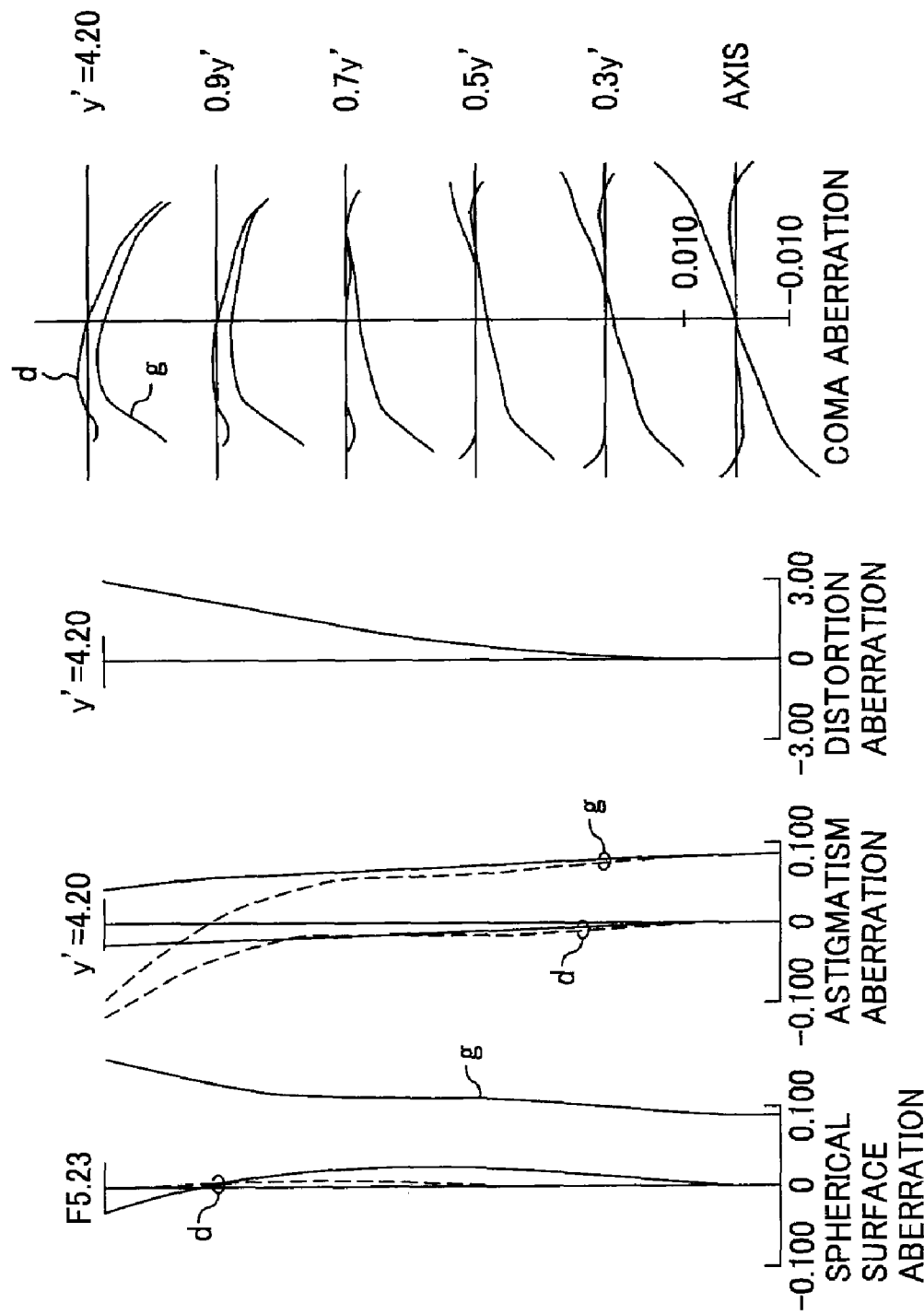
FIG. 7 is a view showing an aberration with respect to a long focus end, i.e., a telephoto, according to the first embodiment.
Figure 8:
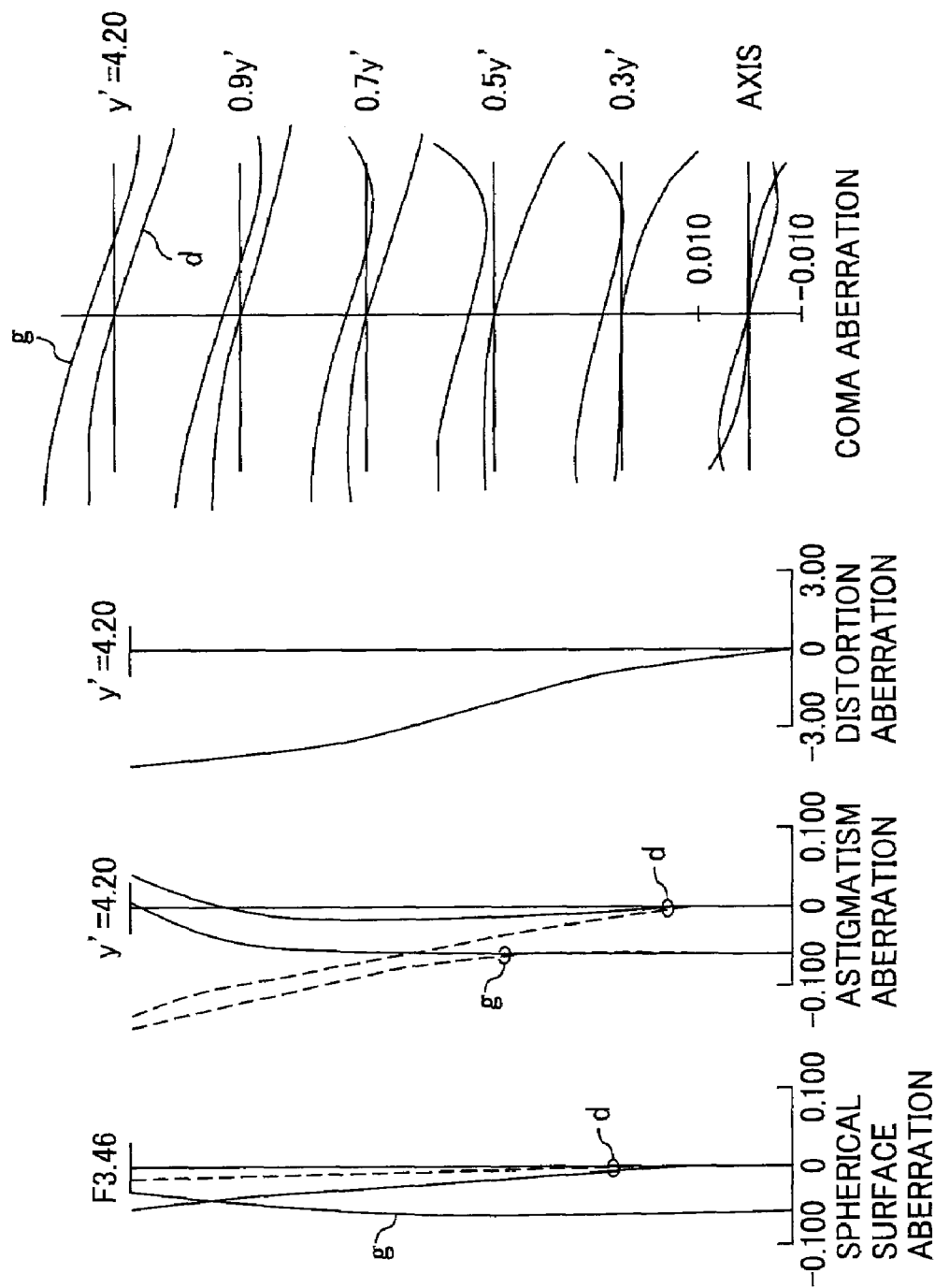
FIG. 8 is a view showing an aberration with respect to a short focus end, i.e., a wide angle, according to the second embodiment.
Figure 9:
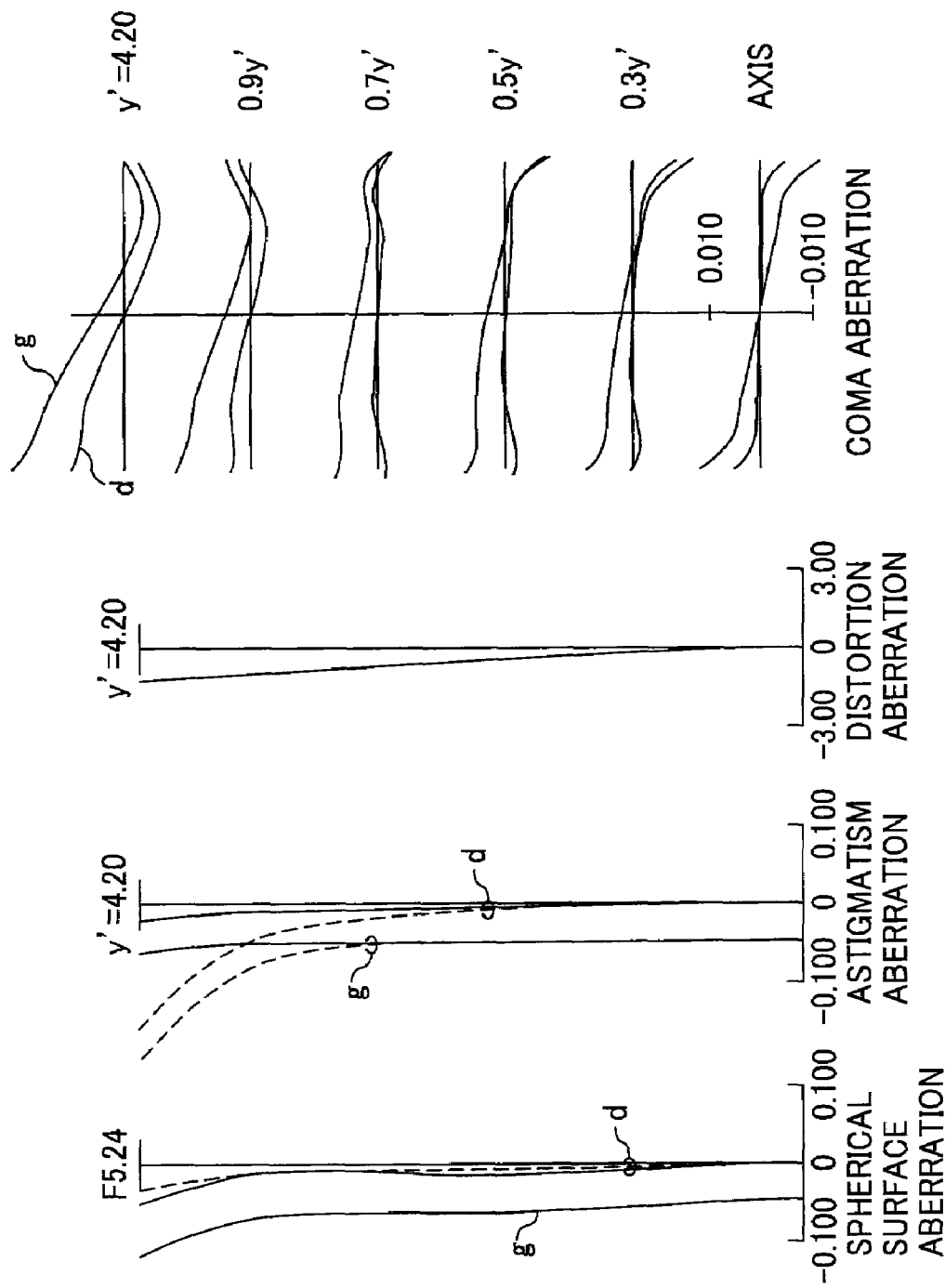
FIG. 9 is a view showing an aberration with respect to a middle focus length according to the second embodiment.
Figure 10:
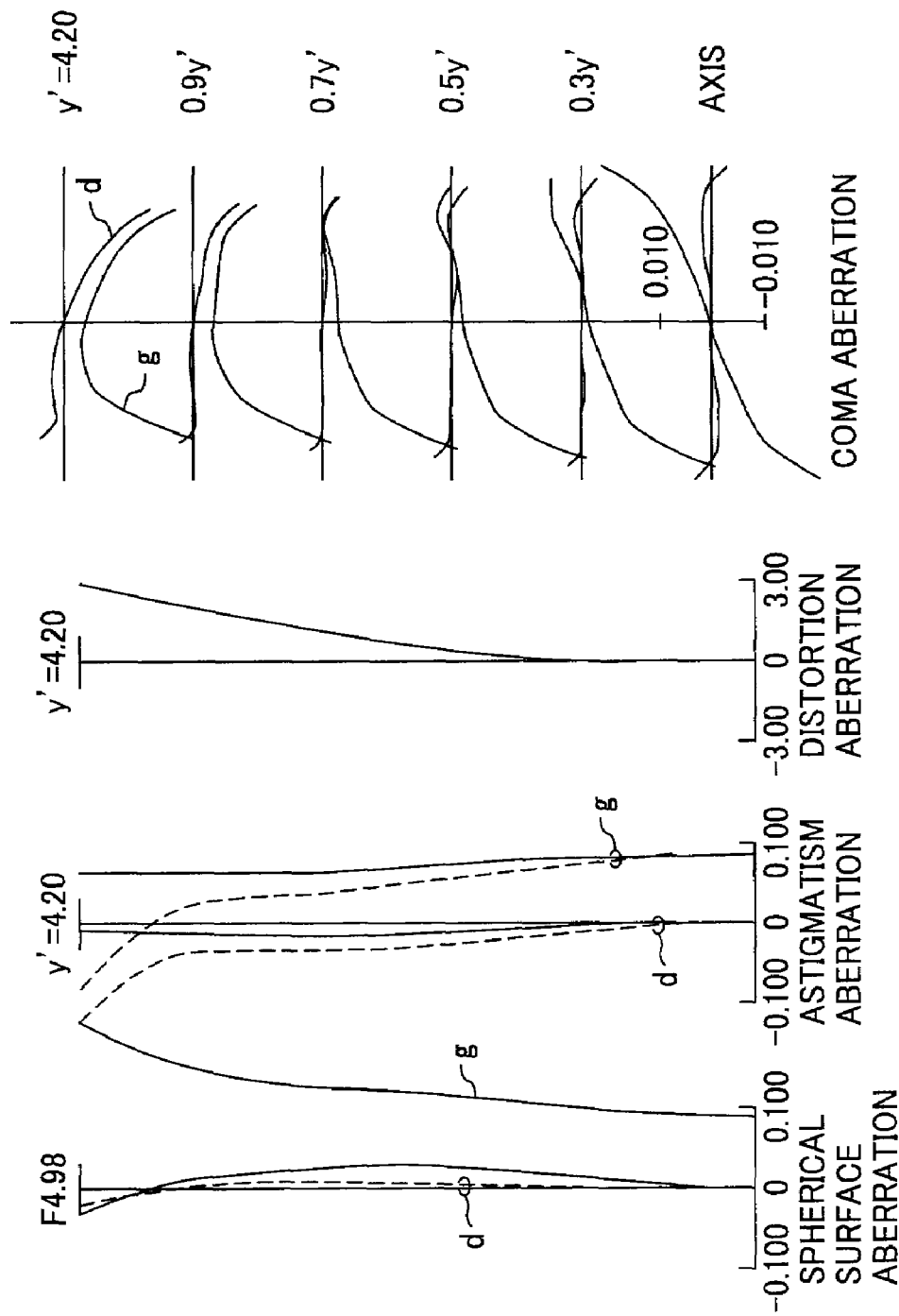
FIG. 10 is a view showing an aberration with respect to a long focus end, i.e., a telephoto, according to the second embodiment.
Figure 11:
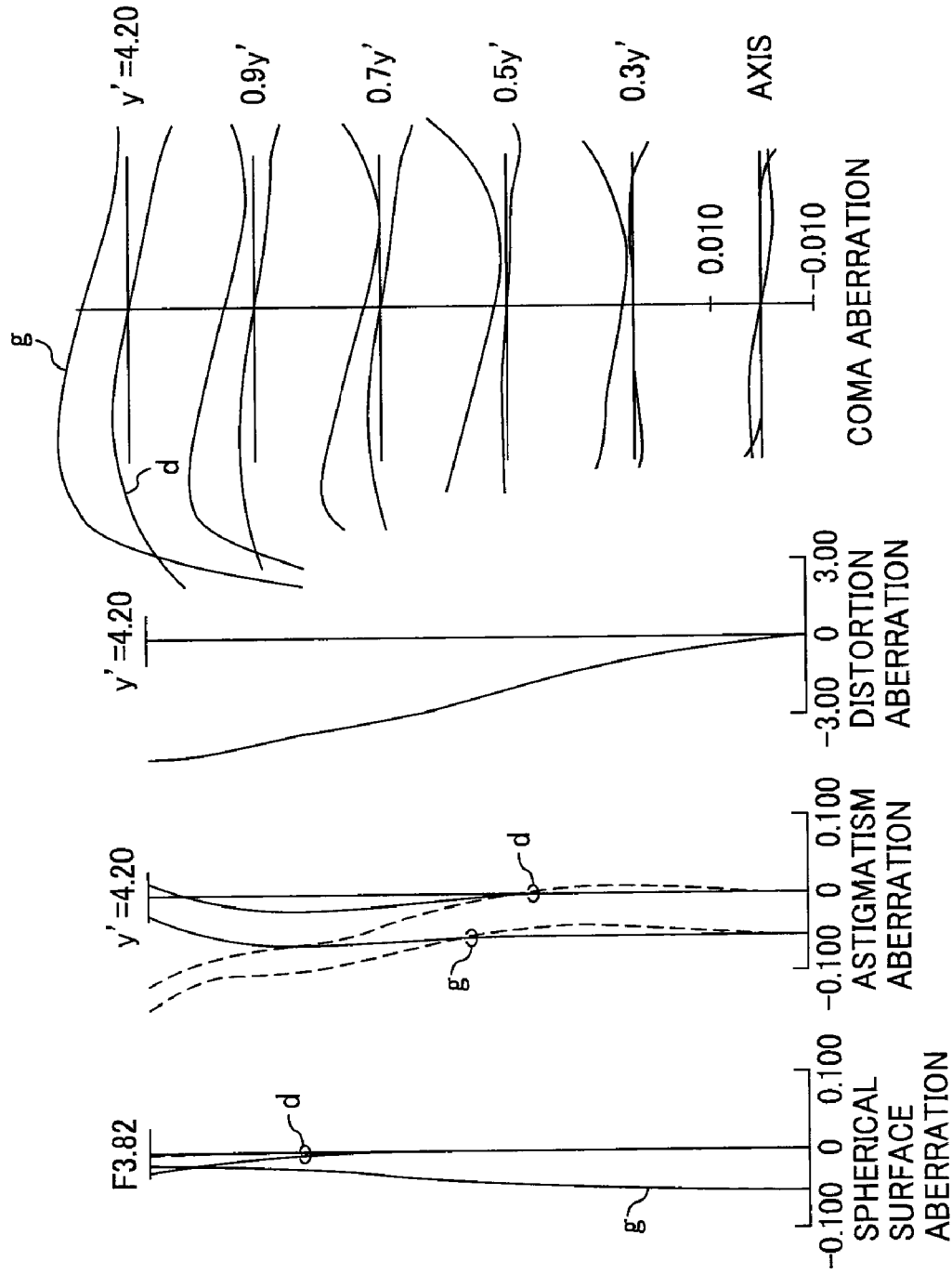
FIG. 11 is a view showing an aberration with respect to a short focus end, i.e., a wide angle, according to the third embodiment.
Figure 12:
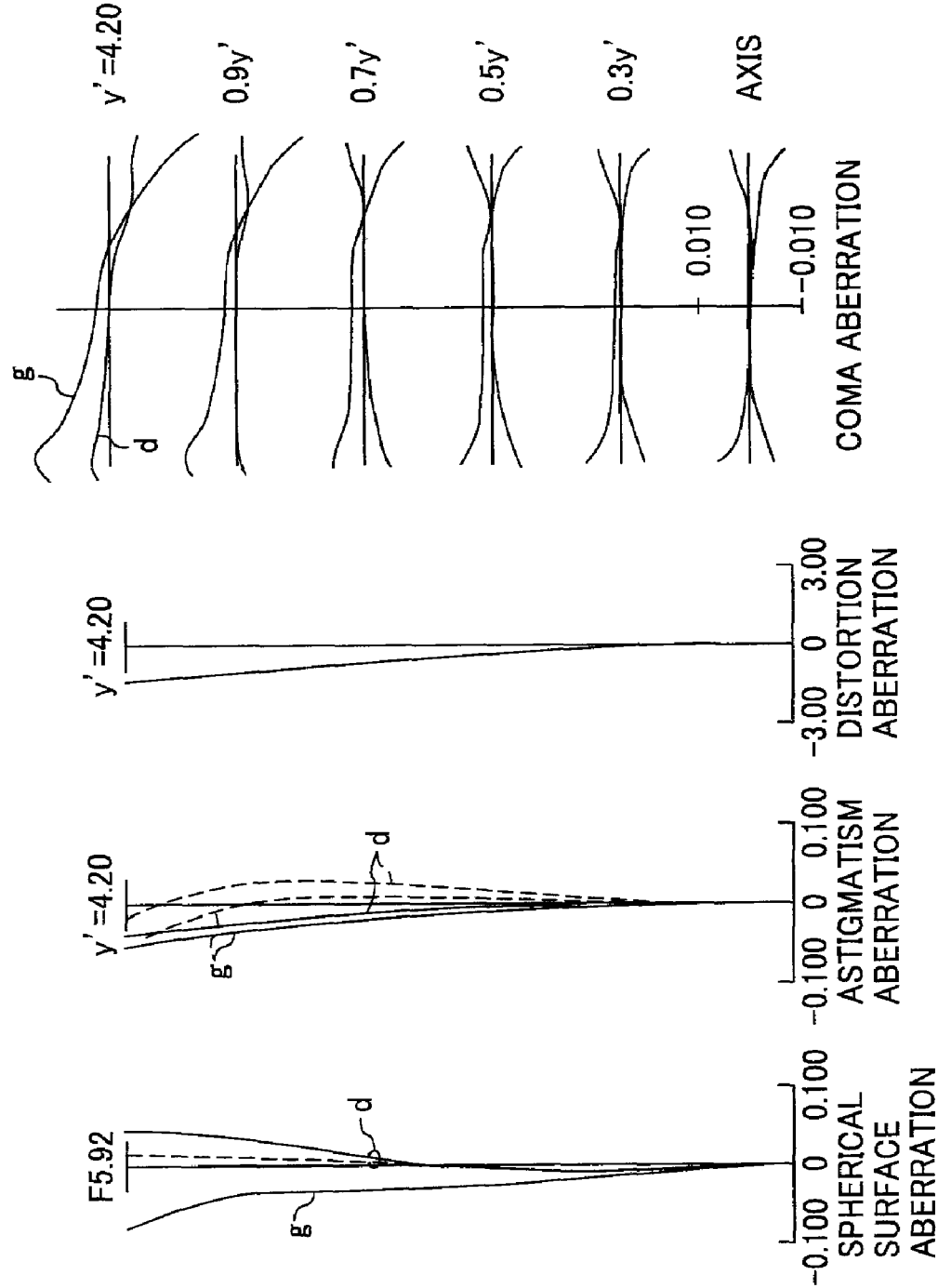
FIG. 12 is a view showing an aberration with respect to a middle focus length according to the third embodiment.
Figure 13:
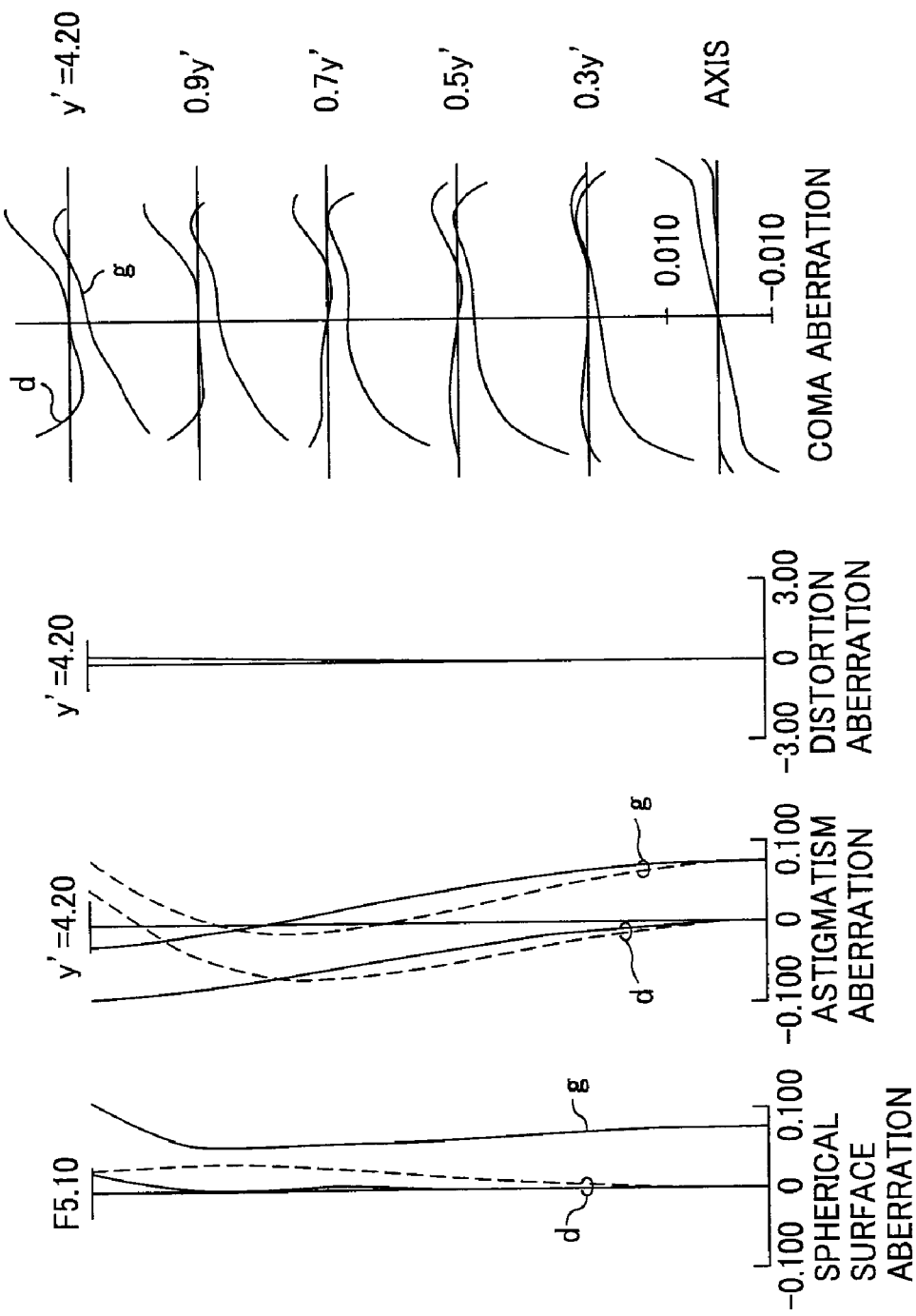
FIG. 13 is a view showing an aberration with respect to a long focus end, i.e., a telephoto, according to the third embodiment.
Figure 14:
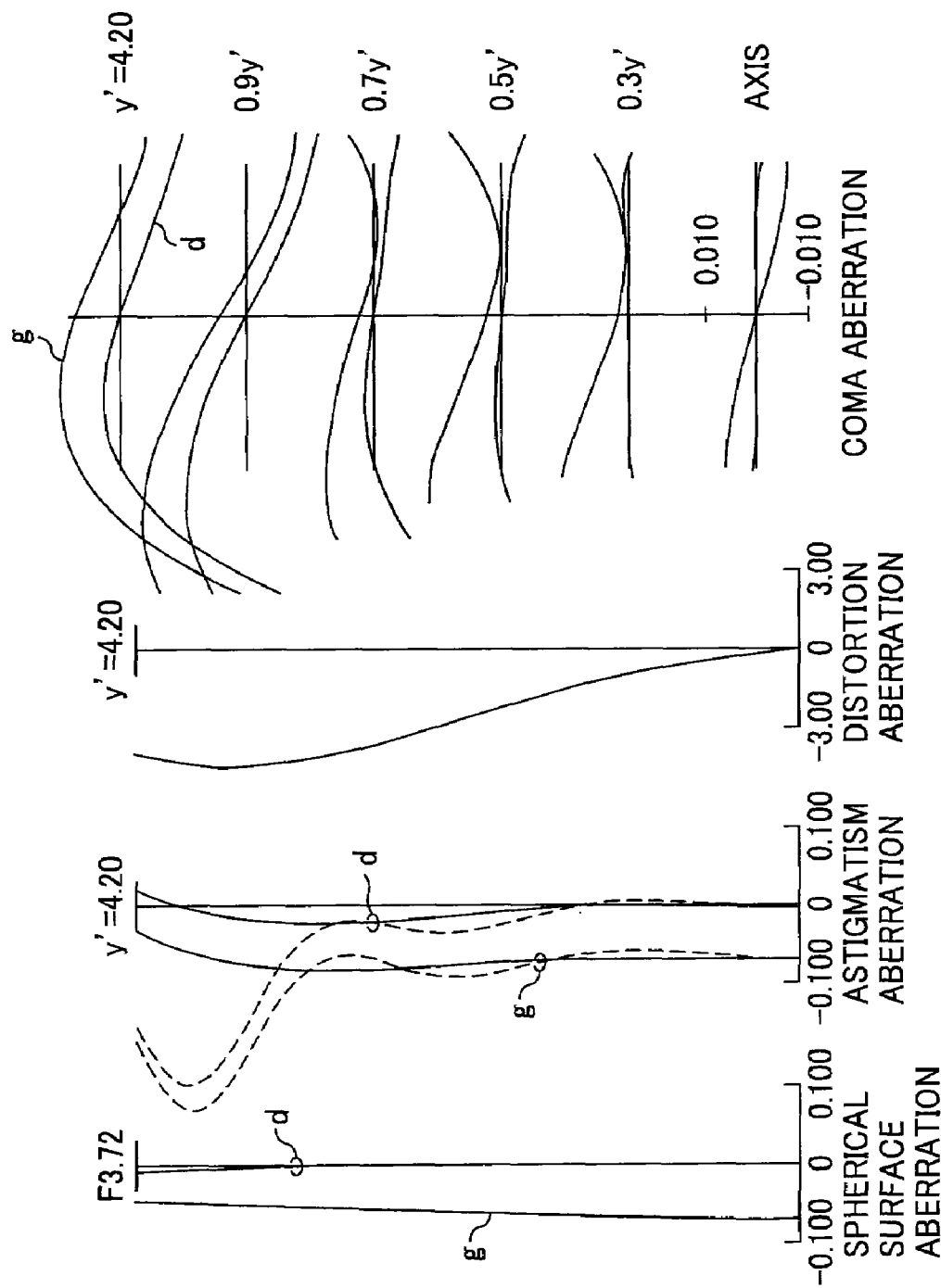
FIG. 14 is a view showing an aberration with respect to a short focus end, i.e., a wide angle, according to the fourth embodiment.
Figure 15:
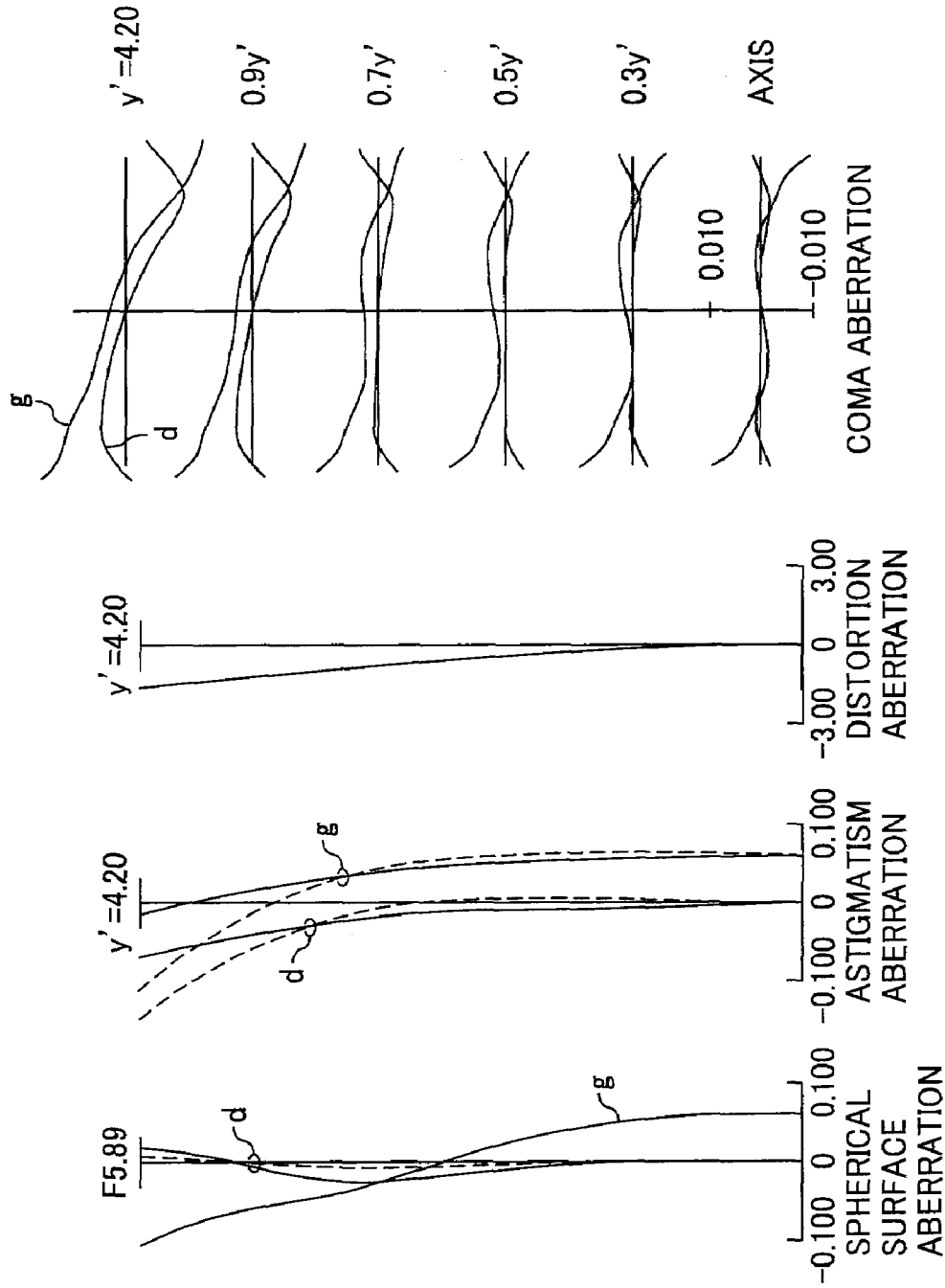
FIG. 15 is a view showing an aberration with respect to a middle focus length according to the fourth embodiment.
Figure 16:
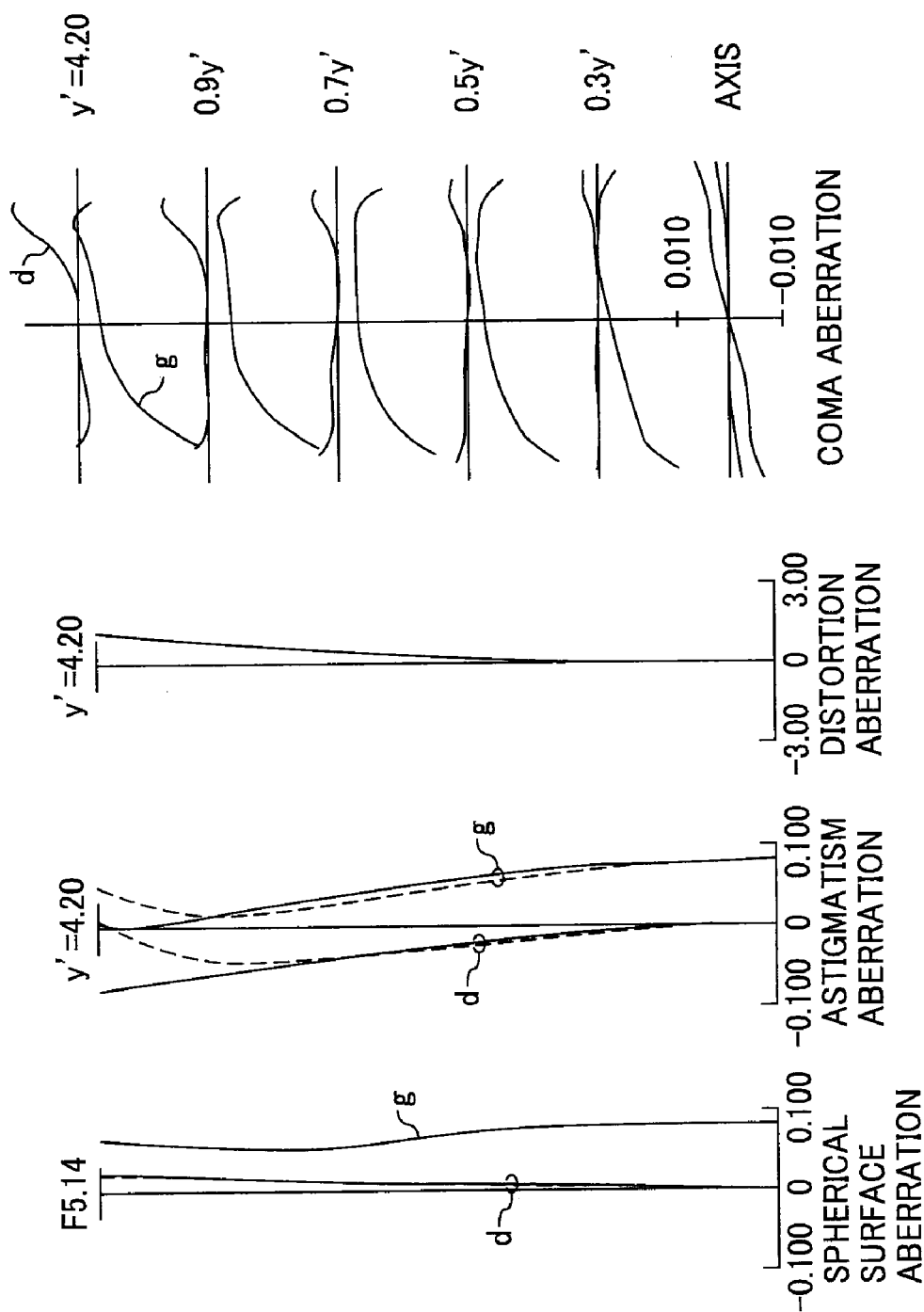
FIG. 16 is a view showing an aberration with respect to a long focus end, i.e., a telephoto, according to the fourth embodiment.

FIG. 5 to FIG. 7 respectively illustrate a view showing an aberration with respect to a short focus end, i.e., a wide angle, a middle focus distance, and a long focus end, i.e., a telephoto, according to the first embodiment. FIG. 8 to FIG. 10 respectively illustrate a view showing an aberration with respect to a short focus end, i.e., a wide angle, a middle focus distance, and a long focus end, i.e., a telephoto, according to the second embodiment. FIG. 11 to FIG. 13 respectively illustrate a view showing an aberration with respect to a short focus end, i.e., a wide angle, a middle focus distance, and a long focus end, i.e., a telephoto, according to the third embodiment. FIG. 14 to FIG. 16 respectively illustrate a view showing an aberration with respect to a short focus end, i.e., a wide angle, a middle focus distance, and a long focus end, i.e., a telephoto, according to the fourth embodiment. It is to be understood that "g" in the respective views showing the aberration denotes a "g line" therein, and that "d" in the respective views showing the aberration denotes a "d line" therein.

As is apparent from the respective views showing the aberration that are described herein, according to each respective embodiment, the aberration is adequately corrected, and the following objectives are achieved: a wide field angle with a half field angle of 38 degrees or more, an F number of 6.0 or less in the long focus end, i.e., the telephoto, and a magnification of 6.0× or greater. As a consequence, a good quality of image performance is maintained together with an adequate degree of miniaturization.

As is clear from the description provided herein, it is possible to implement a new type of zoom lens according to the present invention. According to the embodiment (to be described hereinafter), the zoom lens according thereto comprises a good quality of performance, i.e., a magnification of 6× or more, and it is possible to miniaturize, as well as to reduce a weight of, a camera apparatus or a portable information terminal device, by employing a reflective photosensitive element of a first lens group to refract a light path therein.

Although the preferred embodiments of the present invention have been described, it should be noted that the present invention is not limited to these embodiments, various modifications and changes can be made to the embodiments.

What is claimed is:

1. A zoom lens, comprising:
a first lens group having a negative focal length, a second lens group having a positive focal length, a third lens group having a negative focal length, a fourth lens group having a positive focal length, and a fifth lens group having a positive focal length, which are disposed in order from nearest to furthest from a subject;
wherein:
the first lens group includes a reflective optical element;
the third lens group includes an aperture stop which is disposed in a subject side or an image side of the third lens group or within the third lens group; and
when magnifying from a short focus end to a long focus end, an interval between the first lens group and the second lens group is configured to reduce, an interval between the second lens group and the third lens group is configured to increase, an interval between the third lens group and the fourth lens group is configured to reduce, an interval between the fourth lens group and the fifth lens group is configured to increase, and the fifth lens group is moved toward the subject.

2. The zoom lens according to claim 1, further comprising a sixth lens group having a negative focal length, which is installed in the image side of the fifth lens group as a fixed lens group.

3. The zoom lens according to claim 1, wherein: with a degree of change of interval between the fourth lens group and the fifth lens group when magnifying from the short focus end to the long focus end of m45, and a maximum image resolution of Y', a conditional expression 1 is satisfied, as follows:

$$1.0 < m45/Y' < 6.0. \tag{1}$$

4. The zoom lens according to claim 1, wherein: the focal length of the fifth lens group is f5, and with the maximum image resolution of Y', a conditional expression 2 is satisfied, as follows:

$$4 < f5/Y' < 15. \tag{2}$$

5. The zoom lens according to claim 1, wherein: a focusing of the zoom lens is performed by the fifth lens group.

6. The zoom lens according to claim 1, wherein: when a lateral magnification of the fifth lens group with respect to the short focus end is b5w, and the lateral magnification of the fifth lens group with respect to the long focus end is b5t, a conditional expression 3 is satisfied, as follows:

$$1.2 < b5t/b5w < 2.5. \tag{3}$$

7. The zoom lens according to claim 1, wherein: the fifth lens group includes a lens with a positive focal length and a lens with a negative focal length.

8. The zoom lens according to claim 1, wherein: when magnifying from the short focus end to the long focus end, the fifth lens group first moves toward the photographic subject, and then toward the imaging site.

9. A camera apparatus comprising: the zoom lens according to claim 1, as a photographic lens thereof.

10. The camera apparatus according to claim 9, further comprising: a function configured to treat a photographic image as a digital information.

11. A portable information terminal device, comprising: the camera apparatus according to claim 9 as a photographic unit thereof.

* * * * *